United States Patent [19]

Leo

[11] Patent Number: 5,419,283
[45] Date of Patent: May 30, 1995

[54] ANIMAL CHEW TOY OF STARCH MATERIAL AND DEGRADABLE ETHYLENE COPOLYMER

[75] Inventor: Franca Leo, Turin, Italy

[73] Assignee: Ciuffo Gatto S.r.l., Turin, Italy

[21] Appl. No.: 107,455

[22] Filed: Aug. 17, 1993

Related U.S. Application Data

[63] Continuation-in-part of Ser. No. 8,614, Jan. 22, 1993, abandoned.

[30] Foreign Application Priority Data

Apr. 8, 1992 [IT] Italy .................... MI92U0345

[51] Int. Cl.⁶ .............................................. A01K 29/00
[52] U.S. Cl. .................................................... 119/709
[58] Field of Search ............... 119/709, 710; 606/234, 606/235; 426/6, 104, 132, 805

[56] References Cited

U.S. PATENT DOCUMENTS

| | | | |
|---|---|---|---|
| 3,104,648 | 9/1963 | Fisher | 119/29 |
| 3,871,334 | 3/1975 | Axelrod | 119/710 |
| 4,364,925 | 12/1982 | Fisher | 119/710 |
| 4,557,219 | 12/1985 | Edwards | 119/29.5 |
| 4,771,733 | 9/1988 | Axelrod | 119/29.5 |

FOREIGN PATENT DOCUMENTS

| | | |
|---|---|---|
| 0247606 | 12/1987 | European Pat. Off. . |
| 0400531 | 12/1990 | European Pat. Off. . |
| 0400532 | 12/1990 | European Pat. Off. . |
| 2115837 | 10/1972 | Germany ............ 119/710 |
| WO90/10671 | 9/1990 | WIPO . |
| WO91/02023 | 2/1991 | WIPO . |
| WO9116825 | 11/1991 | WIPO . |

*Primary Examiner*—Todd E. Manahan
*Attorney, Agent, or Firm*—Lyon & Lyon

[57] ABSTRACT

A chew toy for animals is molded into the shape of a familiar animal food item, such as a dog bone, from a polymer composition which is both edible and degradable. The composition is essentially comprised of a starch material and a degradable ethylene copolymer, preferably poly-ethylene-acrylic acid or poly-ethylene, vinylalcohol. The preferred weight ratio of the ethylene copolymer and the starch material is within the range of about 1:1 to 2:1. Plasticizers and edible lubricants can also be added to the composition.

5 Claims, 1 Drawing Sheet

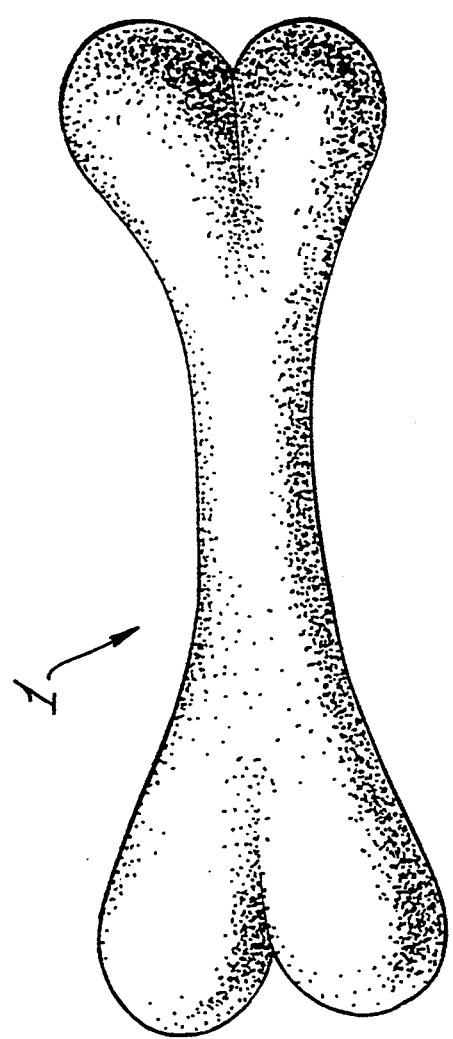

ANIMAL CHEW TOY OF STARCH MATERIAL AND DEGRADABLE ETHYLENE COPOLYMER

DESCRIPTION

This application is a continuation in part of U.S. Ser. No. 08/008,614, filed on Jan. 22, 1993, now abandon.

This invention relates to an article for animals entertainment, particularly intended for pets.

It is a well-known fact that animals often like to play with objects of all kind that they may retrieve, using them for their entertainment.

In the specific instance of pets, specifically dogs and cats, they usually like to play with discarded household objects, as their owner may intentionally or casually have set them aside for this use. These objects, following prolonged use, may even become familiar with animal, such that the animal often grow attached to them.

It is an object of this invention to provide an entertainment article of the kind outlined above, which is so designed and structured as to be specially attractive for the animal to whom it is aimed.

According to the present invention, this object is achieved by an article as specified above and characterized in that it is basically composed of a plastic material based on natural, biodegradable polymers.

Preferred materials for the articles include starch, starch hydrolyzate or destrines and blends thereof with substantially biodegradable thermoplastic polymers either synthetic or natural, particularly biodegradable ethylene copolymers.

The preferred materials are thermoplastic blends obtained by processing starch and said thermoplastic polymers in the presence of a limited amount of water (10–40% wt. referred to the starch/water system) or of a polyol plasticizer (10–40% wt. referred to the starch/polyol system), under extrusion cooking conditions thereby to provide a melt to be extruded and transformed into pellets for use in injection moulding or to be directly injection moulded.

Preferred polymers to be blended with starch include poly-ethylene-vinylalcohol and poly-ethylene-acrylic acid. The weight ratio of said polymers and starch (natural starch being preferred) is generally comprised within the range 1:6 to 2:1; higher amounts of starch are preferred so that the preferred relative ratio is from 1:6 to 1:1.

Preferred plasticizers, which are preferably used in combination with a small amount of water such the intrinsic water content of starch (5–15% wt.), include edible polyhydric alcohols such as particularly glycerol, sorbitol, sorbitan, mannitol, maltitol, hydrogenated starch syrup, sucrose, maltose and fructose.

The composition may further include edible lubricants comprising mono-, di-, and tri-esters of edible polyhydric alcohols, such as those mentioned above, with edible higher fatty acids, such as stearic acid, oleic acid, linoleic acid, linolenic acid, palmitic acid and lauric acid. Other lubricants include phospholipids, such as lecithine and phosphoric acid derivatives of the above-mentioned esters.

Biodegradable blends suitable for use in the present invention are described in EP-A-0 400 532, incorporated herein by reference.

Further features and advantages of this invention will be more clearly apparent from the following detailed description of the embodiment thereof given by way of example and not of limitation, with reference to the appended drawing.

The figure illustrates a bone-like article according to the invention.

With reference to the drawing, an article—according to the invention—is generally shown at 1 and has the appearance of a bone that may be commonly given to dogs.

This bone-like article is formed from a edible support material as previously described; in a preferred embodiment of the invention, a material commercially known as MATER-BI and manufactured by Novamont company is used.

An article for animals entertainment, according to this invention, affords a great number of advantages.

In the embodiment just described, the article has a shape with which the addressed animals, presently a dog, is likely to be familiar with and into which the animal would rather bite like in any other item of this standard diet. In fact, the entertainment article of this invention could advantageously be provided with a shape of a food item that may appeal to the animal and, therefore, even with the shape of piece of meat where a dog is involved.

Further, the plastics with which the bone is formed has an alluring smooth appearance, is odourless in its normal state and has proved to be exceedingly attractive for animal species on which it has been tested. The articles made from the above-described plastics material are substantially water insoluble, although they are susceptible to swell somewhat in water.

It has surprisingly be found that the aforesaid preferred plastics can be easily digested by the animal, and if shattered do not produce sharpened fragments that could be harmful for the animal.

Another advantage of this invention resides in that the plastics material can be processed into the final article, using standard methods and equipments conventionally employed in plastics processing art. This enables the entertainment article to be formed in any shape and size. Further, the aforesaid plastics may be processed into a porous structure whereby any desired additional substance can be associated with the article to enhance its quality. Such would be the case, for instance, of nourishing integrative substances such as vitamins, proteins, mineral salts or flavouring substances or therapeutical substances such as fluorine or fluorine containing compounds suitable for dental care or any substance effective to enhance the attractiveness of the article for the intended animal.

Therefore, it should be emphasized that depending on the application for which the article of this invention is intended, that is either domestic of wild animal species the same can be made in different forms. As an example, where a cat is involved, it could be made in the shape of a fish or a small mouse or any other item of food associated with this animal.

I claim:

1. An edible chew toy for animals molded into a desired configuration from a degradable polymer composition comprising: a first material selected from the group consisting of starch, starch hydrozolate and starch destrines and mixtures thereof; and a degradable ethylene copolymer selected from the group consisting of poly-ethylene-acrylic acid, poly-ethylene-vinylalcohol and mixtures thereof; and wherein the weight ratio of said ethylene copolymer and said first material is within the range of about 1:6 to 2:1.

2. An edible chew toy for animals molded into a desired animal food configuration from a degradable polymer composition comprising: a first material selected from the group consisting of starch, starch hydrozolate and starch destrines and mixtures thereof; and a degradable ethylene copolymer selected from the group consisting of poly-ethylene-acrylic acid, poly-ethylene vinylalcohol and mixtures thereof; and wherein the weight ratio of said ethylene copolymer and said first material is within the range of about 1.6 to 1.1.

3. The chew toy of claims 1 or 2 wherein said composition includes a plasticizer in an amount of from 10% to 40% by weight, said plasticizer being selected from the group consisting of glycerol, sorbitol, sorbitan, mannitol, maltitol, hydrogenated starch syrup, sucrose, maltose, fructose and mixtures thereof.

4. An edible chew toy for animals molded from a degradable polymer composition so as to define a dog bone, said composition being comprised of a starcheous material having a degradable ethylene copolymer disbursed therein and wherein the weight ratio of said ethylene copolymer and said starcheous materials is within the range of about 1.6 to 1.1.

5. An edible chew toy for animals formed of a thermo-plastic blend comprising: a first material selected from the group consisting of starch, starch hydrolyzate, starch destrines and mixtures thereof; a degradable ethylene copolymer; and an edible lubricant selected from mono-, di-, and tri-esters of edible polyhydric alcohols with edible higher fatty acids and phospholipids.

* * * * *

UNITED STATES PATENT AND TRADEMARK OFFICE
CERTIFICATE OF CORRECTION

PATENT NO. : 5,419,283
DATED : May 30, 1995
INVENTOR(S) : Franca Leo

It is certified that error appears in the above-indentified patent and that said Letters Patent is hereby corrected as shown below:

```
Column 2, line 32, please change "be" to read --been--.

Column 3, lines 11-12, please change "1.6 to 1.1" to read --1:6 to
  1:1--.

Column 4, line 9, please change "1.6 to 1.1" to read --1:6 to
  1:1--.
```

Signed and Sealed this

Thirtieth Day of July, 1996

Attest:

BRUCE LEHMAN

*Attesting Officer*  *Commissioner of Patents and Trademarks*